United States Patent [19]

Hyppanen

[11] Patent Number: 5,738,712
[45] Date of Patent: Apr. 14, 1998

[54] CENTRIFUGAL SEPARATOR ASSEMBLY AND METHOD FOR SEPARATING PARTICLES FROM HOT GAS

[75] Inventor: Timo Hyppanen, Karhula, Finland

[73] Assignee: Foster Wheeler Energia Oy, Helsinki, Finland

[21] Appl. No.: 402,170

[22] Filed: Mar. 13, 1995

[51] Int. Cl.⁶ ................................................ B01D 45/12
[52] U.S. Cl. ............... 95/271; 55/269; 55/459.1; 55/459.4; 95/288; 422/147
[58] Field of Search ................. 95/269, 271, 288; 55/447, 459.1, 459.5, 459.4, 269; 422/146, 147

[56] References Cited

U.S. PATENT DOCUMENTS

| | | | |
|---|---|---|---|
| 479,231 | 7/1892 | Van Gelder | 55/459.1 |
| 522,769 | 7/1894 | Thompson | 55/459.1 |
| 638,983 | 12/1899 | Osborne | 55/459.1 |
| 710,603 | 10/1902 | Osborne et al. | 55/459.1 |
| 2,991,981 | 7/1961 | Andersen | 55/269 |
| 3,470,678 | 10/1969 | Clark et al. | 55/269 |
| 4,108,778 | 8/1978 | Lambert et al. | 55/459.1 |
| 4,298,359 | 11/1981 | Keller et al. | 55/269 |
| 4,344,538 | 8/1982 | Fujisawa et al. | 55/459.1 |
| 4,848,993 | 7/1989 | Elkjaer | 55/459.1 |
| 4,872,892 | 10/1989 | Vartiainen et al. | 55/447 |
| 4,913,711 | 4/1990 | Stewart | 55/459.1 |
| 4,961,761 | 10/1990 | Johnson | 55/269 |
| 5,123,939 | 6/1992 | Morin et al. | 55/269 |
| 5,281,398 | 1/1994 | Hyppanen et al. | 422/147 |

FOREIGN PATENT DOCUMENTS 2189491Y  1/1995  China.

OTHER PUBLICATIONS

"Pyroflow Compact: A second Generation CFB Boiler by Ahlstrom Pyropower", Gamble et al., Fluidized Bed Combustion, vol. 2, ASME 1993, pp. 751–760.

Primary Examiner—Jay H. Woo
Assistant Examiner—Duane S. Smith
Attorney, Agent, or Firm—Nixon & Vanderhye P.C.

[57] ABSTRACT

A centrifugal separator has a plurality of substantially planar walls, including a first wall, defining a vortex chamber having an interior gas volume and for establishing at least one gas vortex in the gas volume, and the gas volume has a cross section that is distinctly non-circular, (and preferably quadrate). In addition to conventional outlets the separator includes a gas inlet having at least one elongated jet-defining wall with a free end portion extending into the gas volume a first distance from the first wall, to define a gas jet that extends substantially tangentially to the gas vortex in the gas volume. An insert extends between the jet-defining wall free end portion and the first wall and defines a gas flow direction changing surface. The insert may be substantially solid refractory material, or include a number of cooling fluids circulating tubes, and a gas flow direction changing surface may be substantially planar or curved. The first distance is typically at least 50 mm, but less than 25% of the dimension of the wall perpendicular to the first wall. The jet defining wall and the gas direction changing surface may make an angle α between 20°–80° and the first distance may be between 0.2–5 times the width of the gas inlet. The height of the gas inlet is at least twice as great as its width.

29 Claims, 4 Drawing Sheets

1

CENTRIFUGAL SEPARATOR ASSEMBLY AND METHOD FOR SEPARATING PARTICLES FROM HOT GAS

BACKGROUND AND SUMMARY OF THE INVENTION

U.S. Pat. No. 5,281,398 (the disclosure of which is incorporated by reference herein) discloses a centrifugal separator for separating particles entrained in hot gases in a vortex chamber defined by a plurality of substantially planar plates or panels, preferably in a quadrate cross-section, or of another polygonal shape. Such a separator has numerous advantages over conventional centrifugal separators, particularly in ease of construction, cost, and the like. The gas is introduced into the vortex chamber through one or more gas inlets in the side wall so as to guide the gas tangentially into the vortex formed inside the vortex chamber to maximize the swirling or spinning of the gas as it is introduced. Such centrifugal separators are ideally utilized in connection with any type of circulating fluidized bed reactor, but also—as described in an article entitled "Pyroflow Contact: A Second Generation CFB Boiler by Ahlstrom Pyropower", Gamble et al, Fluidized Bed Combustion, vol. 2, ASME, 1993, pages 751–760—can be utilized on a commercial scale in boiler applications.

While such planar wall centrifugal separators are highly advantageous, according to the present invention it has been recognized that there is a quirk in the efficiency of operation of such separators believed to be due to the planar geometry at the gas inlet or inlets. In some configurations, at the area of the inlet particles which are on the periphery of the gas vortex tend to separate out from the gas as they flow along the front wall of the vortex chamber, containing the gas inlet and interfere with the proper introduction of the gas into the vortex chamber, interfering with the desired intensity of swirling or spinning action of the gas and particles in the vortex.

According to the present invention an apparatus and method are provided for overcoming the disruption in the gas inlet that can occur in the otherwise advantageous centrifugal separators as disclosed in U.S. Pat. No. 5,281, 398. According to the present invention the gas inlet is constructed in such a way, and the surrounding area of the front wall containing the gas inlet adjacent the inlet is configured, so that the particles tending to separate are smoothly redirected from movement along the front wall to movement substantially in the direction of gas introduction. In this way, the swirling action of the particles and gas during tangential introduction into the vortex chamber may be truly maximized.

According to one aspect of the present invention a centrifugal separator assembly is provided that includes the following components which are common to the separator disclosed in U.S. Pat. No. 5,281,398: A plurality of substantially planar walls, including a first wall, defining a vortex chamber having an interior gas volume, and for establishing at least one gas vortex in the gas volume, the gas volume having a cross-section that is distinctly non-circular (that is having a circularity of greater than 1.1, preferably greater than 1.3, and most preferably substantially quadrate). At least one gas outlet for cleaned gas extending from the gas volume. At least one gas inlet formed in the first wall for introducing gas with entrained particles into the gas volume; and at least one separated particles outlet from the gas volume. According to the present invention to prevent disturbances in the gas flow at introduction into the vortex chamber, and/or premature separation of particles from the vortex flow, there are provided a particular configuration of the gas inlet, and flow guiding means. The gas inlet comprises at least one elongated jet-defining wall having a free end portion extending into the gas volume a first distance from the first wall, to define a gas jet extending substantially tangentially to a gas vortex in the gas volume. And the guiding means provided comprise means for guiding the gas vortex between the first wall and the jet-defining wall so that the flow direction of particles separating from gas in the gas vortex is smoothly changed from the first wall to substantially in line with the gas jet (e.g. substantially perpendicular to the first wall at the gas inlet, and substantially tangentially to the gas vortex).

The guiding means preferably comprises an insert extending between the jet-defining wall free end portion and the first wall, and defining a gas flow direction changing surface. The surface may be substantially planar, or curved. The insert may be substantially solid refractory material (e.g. ceramic) or may have a plurality of cooling fluid circulating tubes which cool the gas direction changing surface. Alternatively, or additionally, the jet-defining wall and portions of the first wall adjacent the insert may have a plurality of cooling fluid circulating tubes which cool the insert.

The plurality of substantially planar walls typically includes a second wall substantially perpendicular to and intersecting the first wall. The at least one jet-defining wall may comprise a single jet-defining wall, substantially parallel to the second wall and spaced from the second wall a distance W, defining the width of the gas inlet, and the gas inlet typically has a height H which is greater than 2 W (preferably greater than 4 W). The second wall typically has a length D interior of the gas volume, and the first distance is at least 50 mm but less than 25% of that length D.

Alternatively, the planar walls may include at least second and third walls connected to the first wall, and the at least one jet-defining wall comprises two walls spaced from each other a distance W which defines the width of the inlet openings. The jet-defining walls each have a free end portion which extends into the gas line the first distance, and has an insert with gas direction changing surface, and the walls are disposed in a central section of the first wall remote from the second and third walls. Each of the jet defining walls makes an angle α with respect to its associated gas flow direction changing surface, the angle α typically being between 20°–80°, preferably between about 40°–60°.

Alternatively, the first and second jet-defining walls may define two different gas inlets, the first jet-defining wall adjacent but spaced from and substantially parallel to the second wall, and a second jet-defining wall adjacent but spaced from and substantially parallel to the third wall, each of the jet defining walls in the first wall having a guiding means associated therewith. The first distance is typically between 0.2–5 times the width (W) of the gas inlet.

The plurality of substantially planar walls may comprise a fourth wall, opposite the gas inlet and the first wall, and the fourth wall may include a refractory surface opposite the gas inlet which has enhanced erosion resistant properties compared to the rest of the interior surfaces of the substantially planar walls (whether or not they are also covered with a refractory material).

According to another aspect of the present invention, a centrifugal separator assembly is provided comprising the following elements: A plurality of substantially planar walls, including a first wall, defining a vortex chamber having an interior gas volume, and for establishing at least one gas vortex in the gas volume, the gas volume having a cross-section that is distinctly non-circular and substantially quadrate. At least one gas outlet for cleaned gas extending from the gas volume. At least one gas inlet formed in the first wall for introducing gas with entrained particles into the gas volume. At least one separated particles outlet from the gas volume. The gas inlet comprising at least one elongated jet-defining wall having a free end portion extending into the gas volume a first distance from the first wall, to define a gas jet extending substantially tangentially to a gas vortex in the gas volume. And an insert extending between the jet-defining wall free end portion and the first wall, and defining a smooth flow (gas and particles) direction changing surface.

The centrifugal separator as described above preferably is in combination with a circulating fluidized bed reactor having a reaction chamber, including a fluidized bed therein, and a gas discharge at a top portion thereof and connected to the gas inlet of the centrifugal separator. The gas inlet extends substantially vertically and the gas outlets lead clean gas from the separator gas volume upwardly out of the gas volume, and a return duct leads particles from the bottom of the separator to the bottom portion of the reaction chamber.

According to another aspect of the present invention, a method of separating particles from a stream of gas having particles entrained therein at a temperature higher than 500° C. (typically a temperatures of a circulating fluidized bed reactor, e.g. about 800°–900°) utilizing a centrifugal separator substantially as described above, is provided. A method comprises the following steps: (a) Introducing a stream of gas with entrained particles and at a temperature of higher than 500° C. into the gas volume as a jet in a direction tangential to a vertical axis swirling gas vortex formed in the gas volume, the jet and vortex intersecting at an intersection point. (b) Removing cleaned gas from the top of the gas vortex. (c) Removing separated particles from the bottom of the gas vortex. And (d) smoothly changing the direction of any particles separated from the vortex in the vicinity of the first wall from substantially along the first wall to substantially in the direction of the jet.

Step (d) is typically practiced to prevent settling of particles within the range of 270°–315° from the intersection point. Step (a) is practiced by introducing gas with entrained particles in a flow configuration having a height at least twice as great as its width W, and step (a) is further practiced so that the jet is introduced into the gas volume a distance from the first wall that is between 0.2–5 times W. Step (a) is typically also practiced so that the jet is introduced into the gas volume a distance from the first wall that is greater than 50 mm but less than 25% of the width dimension of the cross-section of the gas volume.

It is a primary object of the present invention to provide a centrifugal separator with planar walls, and a method of operation thereof, which maximizes the swirling action of gas introduced into the gas inlet in one of the planar walls. This and other objects of the invention will become clear from an inspection of the detailed description of the invention and from the appended claims.

DETAILED DESCRIPTION OF THE DRAWINGS

Figure 1:
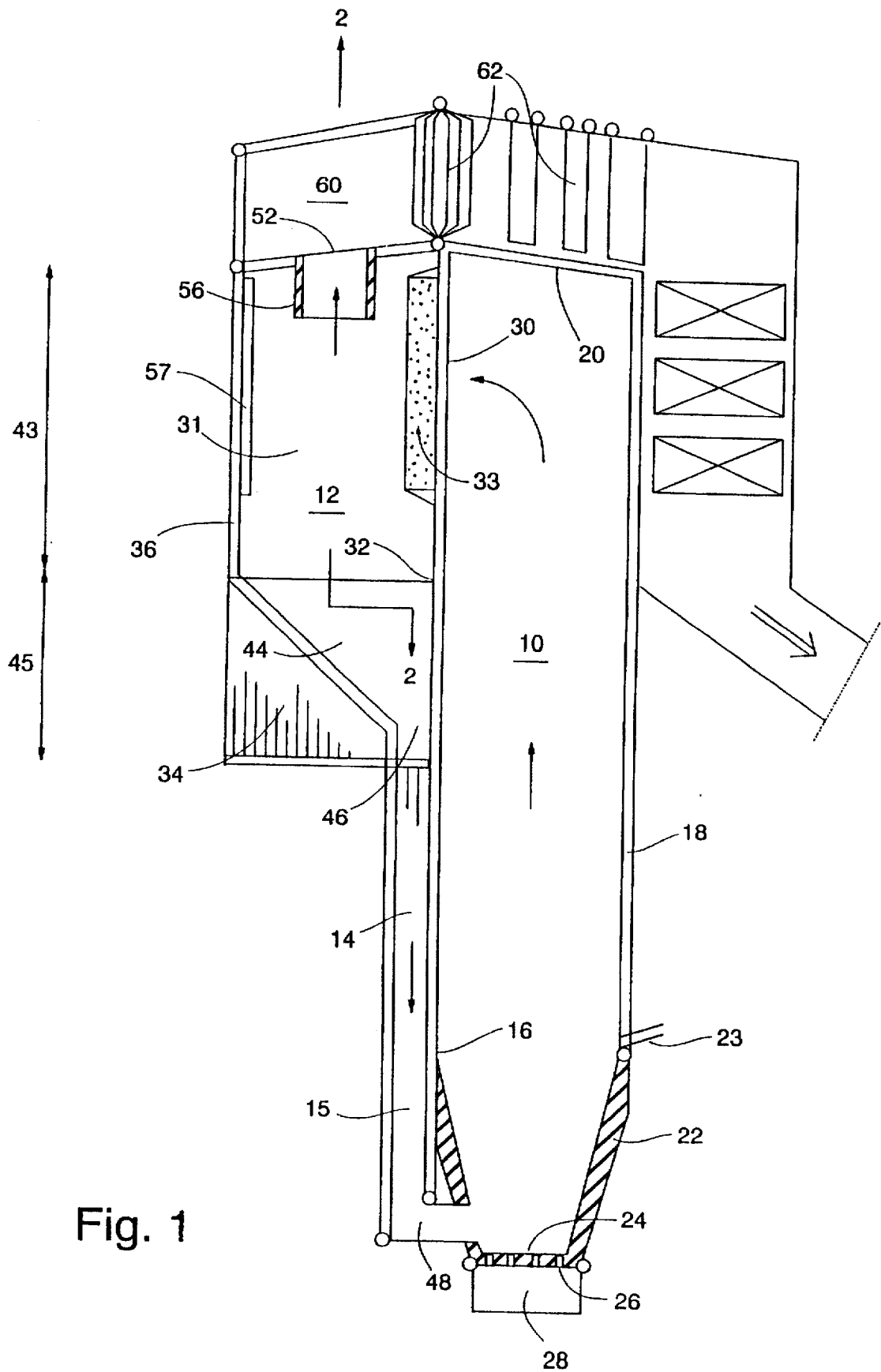
FIG. 1 is a side schematic view, partly in cross section and partly in elevation, of a circulating fluid bed reactor with a centrifugal separator according to the present invention.

FIG. 1 illustrates a circulating fluidized bed reactor comprising a reaction chamber 10, a centrifugal particle separator (cyclone) 12 and a return duct 14 for returning separated particles back to the chamber 10. The cross section of the reaction chamber 10 is rectangular, and the reaction chamber 10 is composed of water tube walls, only the long walls 16 and 18 of which are shown in FIG. 1. The water tube walls are preferably formed of joined vertical water tubes.

The upper part of wall 18 is bent to form the ceiling 20 of the reaction chamber 10. The walls of the lower section of the reaction chamber 10 are protected with refractory material 22. The reactor has an inlet 23 for solid material. The bottom of the reaction chamber 10 is formed of a distribution plate 24, which is equipped with nozzles or openings 26 for introducing fluidizing gas from an air plenum chamber 28 into the reaction chamber 10 for maintaining a fluidized bed in the chamber 10. Fluidizing gas or fluidizing air is introduced into the reaction chamber at such a high rate that it causes a substantial portion of the fluidizing bed material to continuously flow together with the gas into the upper portion of chamber 10 through an opening (e.g. slot) 30 disposed in the upper section of the chamber 10, into the particle separator 12.

The centrifugal separator 12 according to the FIG. 1 embodiment is a multivortex centrifugal separator, in which two parallel, vertical gas vortices separating particles from gas exhausted from the reactor chamber 10 by means of the centrifugal force are formed in the gas volume 31 of the separator 12. A vortex chamber defines the separator 12, and preferably comprises planar, primarily rectangular water tube walls 32, 34, 36 and 38. Preferably, the walls 32, 34, 36, 38 are also made of joined, vertical water tubes 37 connected to each other by fins 39 (see FIG. 2). The vortex chamber of separator 12 according to the FIG. 1 has one long wall, adjacent to the reaction chamber 10, in common with the reaction chamber 10, i.e., part of the wall 16 of the reaction chamber 10 constitutes the wall 32 of the vortex chamber. In some cases distinct walls for both the reactor 10 and the vortex chamber 12 may also be provided.

At the slot 30, the water tube wall 32 is bent towards the inside of the vortex chamber so that the jet-defining walls 40 are formed, defining (see FIGS. 2 and 3) an inlet duct 42 leading the gas flow into the vortex chamber gas volume 31. The slot 30 is high and narrow, higher and narrower than in conventional vertical cyclones, preferably as high as the upper section 43 (see FIG. 1) of the vortex chamber 31. Preferably the ratio of the height to the width of slot 30 is >2, more preferably >4.

Each of the jet-defining walls 40 extends inwardly from the first wall 32 into the gas volume 31 a first distance to a free end portion 41. Also, guiding means are provided, shown generally by reference numeral 33, for guiding the gas vortex between the first wall 32 and the jet-defining wall 40 so that the flow direction of particles separating from gas in the gas vortex is smoothly changed from generally along the interior of the first wall 32 to substantially perpendicular to the first wall 32 at the gas inlet 30 (i.e. substantially tangential to the gas vortex in the gas volume 31 thereat, and along the jet introduced into slot 30).

Figure 2:
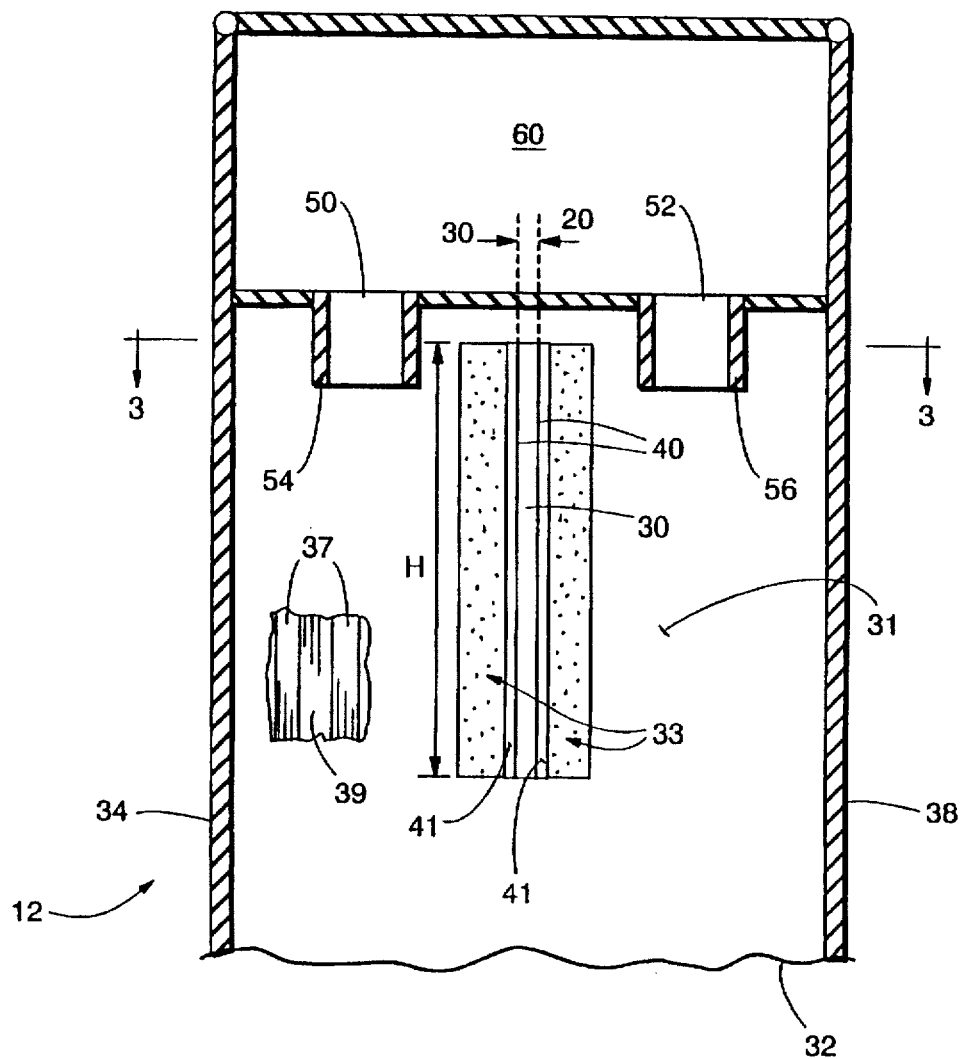
FIG. 2 is a cross sectional view of the centrifugal separator of FIG. 1 taken along lines 2—2 thereof.
Figure 3:
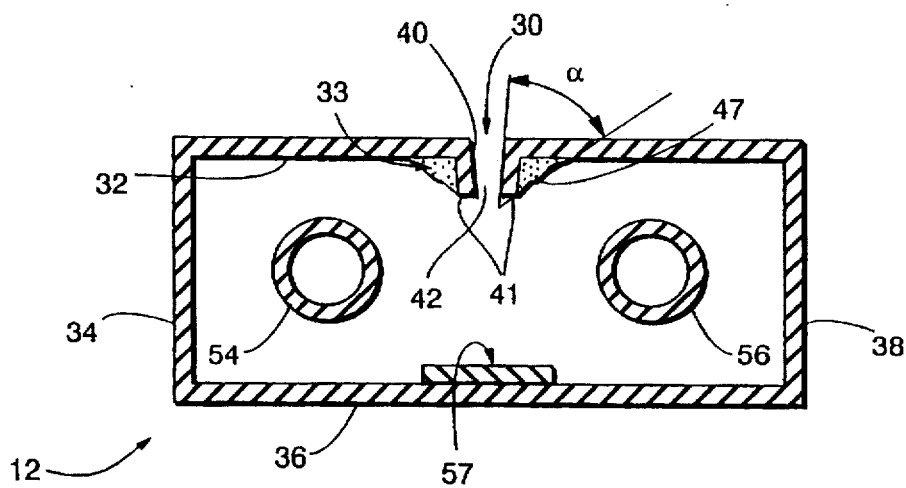
FIG. 3 is a cross sectional view of the separator of FIG. 2 taken along lines 3—3 thereof.
Figure 4:
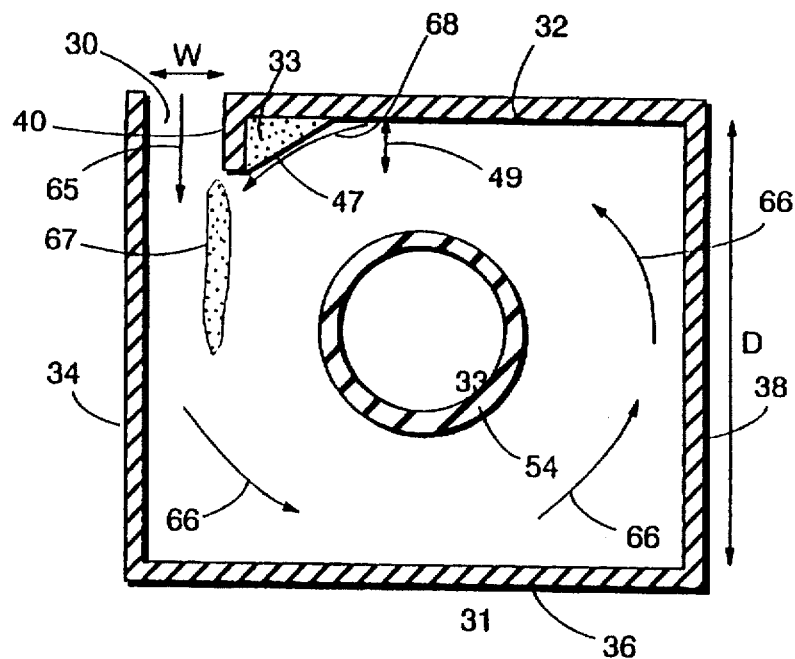
FIGS. 4 through 7 are views like that of FIG. 3 for alternative embodiments of centrifugal separators according to the present invention.
Figure 5:
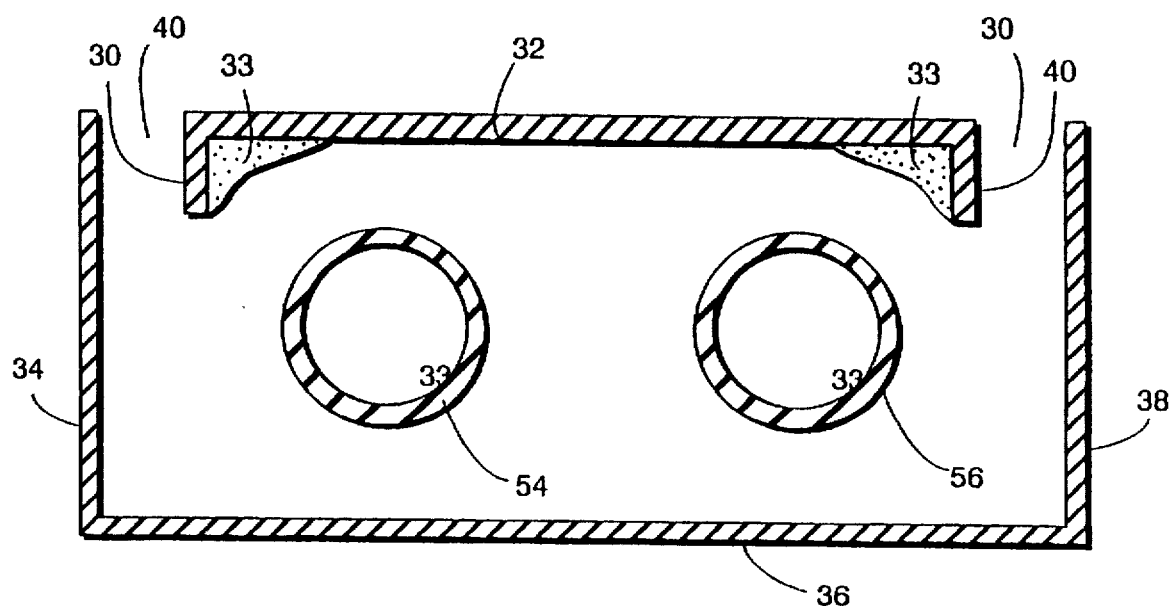
Figure 6:
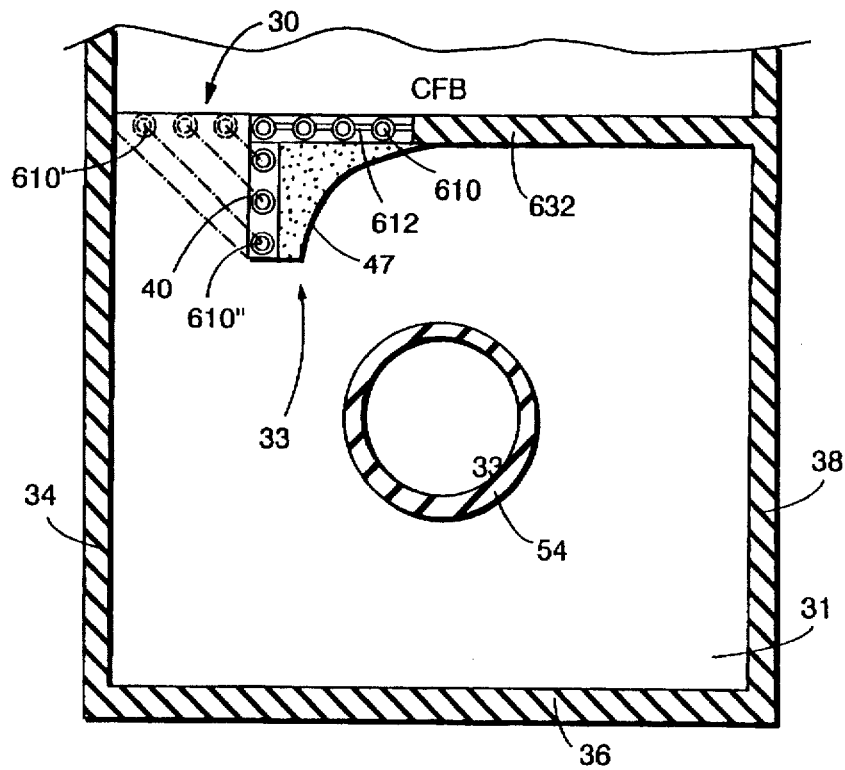
Figure 7:
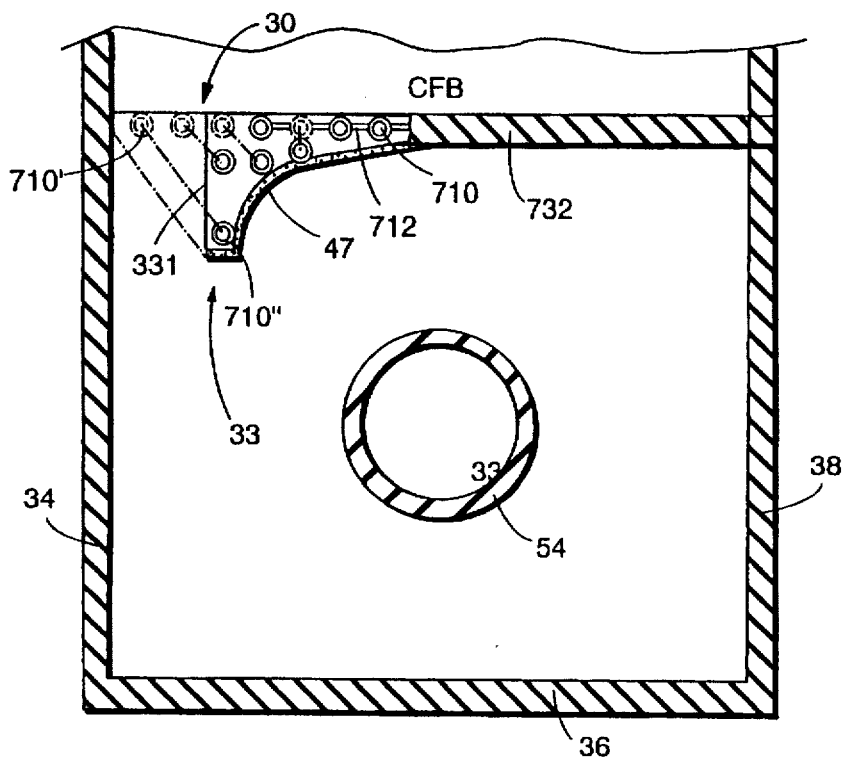

The guiding means 33 may comprise fluid introducing jets at the intersection between the walls 40 and the wall 32 for redirecting the flow, or may comprise electrical or magnetic generating devices which repel the particles at the corners between the wall 41 and the wall 32 if the particles are electrostatically or magnetically charged, or a wide variety of other structures may be provided. However, in the preferred embodiment the guiding means 33 comprises an insert which has a solid gas flow direction changing surface 47. The surface 47 may be substantially planar—as illustrated in FIGS. 3 and 4—or may be curved—as illustrated in FIGS. 5 through 7. In the embodiment illustrated in FIGS. 1 through 5, the insert 33 comprises an insert of substantially solid refractory material, such as a ceramic, crushed refractory held together by a binder, or other conventional refractory materials. The insert 33—as seen in FIG. 2—has a height comparable to the height H of the slot 30. The slot 30 has a width W (e.g. see FIG. 4) and in the preferred construction according to the invention the height H is at least twice as great as the width W, and preferably at least four times as great.

In the embodiment illustrated in FIGS. 2 and 3 in which two jet-defining walls 40 are provided in a central portion of the first (front) wall of the separator 12, each of the walls 40 makes an angle α with the wall 47 (or if the wall 47 is curved, the end points of the surface 47 at the free end 41 of the wall 40 and where the surface 47 intersects the first wall 32). The angle α is preferably 20°–80°, most desirably between about 40°–60°. Also, the first distance—the distance between the wall 32 and the free end 41 along the jet-defining wall 40—is between 0.2–5 times the width W of the slot 30.

As seen in the FIG. 4 embodiment, the first distance (the length of the jet-defining wall 40 between the first wall 42 and the free end 41 thereof) is indicated by reference numeral 49, which typically is at least 50 mm. If the length of the walls 34, 38 from the first wall 32 is D (where a quadrate cross section is provided for the gas volume 31, as illustrated in FIG. 4), then the maximum dimension 49 is less than 25% of D.

The upper parts of the walls of the vortex chamber defining volume 31 are preferably vertical and planar and form the upper section 43. The lower part of the long wall 36 is bent towards the opposite long wall 32 forming the lower section 45 of the vortex chamber. By this structure, an asymmetric, long, funnel-shaped volume 44 (see FIG. 1) is formed, the bottom part of the volume 44 forming a solids outlet 46.

The outlet 46 also serves as an inlet into the return duct 14. The long walls of the return duct are formed by the extensions of the walls 32 and 36 of the particle separator 12. The end walls of the return duct 14 are correspondingly formed by the extensions of the walls 34 and 38. Only a portion having the width of the return duct 14, of the end walls 34 and 38 continues downwardly, thereby forming a return duct. The remaining portions of the end walls only extend to the upper part of the return duct 14, as disclosed in FIG. 1 for a part of wall 34. The lower part of the return duct 14 is in communication with the lower section of the reaction chamber 10 via an L-bend 48, for returning the solids separated in the separator 12 into the fluidized bed in the bottom of chamber 10; other types of solid flow seals may alternatively be used.

In the upper section 43 of the vortex chamber, two successive gas outlet ducts 54 and 56 for the discharge of purified gas from the gas space 31 of the vortex chamber are disposed in openings 50 and 52. The gas outlet ducts 54, 56 in the separator 12 may be either ceramic or cooled ducts in order to resist hot conditions in the separator 12. The gases are conducted from the separator 12 into a duct 60 disposed on top thereof, the duct 60 being provided with heat recovery surfaces 62, and further into a vertical convection section disposed next to the reaction chamber 10, the convection section being also provided with heat recovery surfaces. Instead of using the multivortex concept it may sometimes be preferred to use several separators 12, e.g. two separators 12 with single vortices as shown in FIG. 4, combined together.

Preferably, the heat and abrasion resistant refractory material may be attached directly to at least some portions of the walls 32, 34, 36, and 38 of the vortex chamber. Places which are exposed to heavy abrasion require a thicker layer of refractory, or a more abrasion resistant refractory may be used. Thus, for example, the wall 36, opposite to the gas inlet 30, may be provided with a thick refractory lining 57 (see FIGS. 1 and 3) the length of which corresponds to the height of the inlet 30, 42 (see FIG. 1) At least a portion of the particles entrained in the inlet gas jet flowing into the vortex chamber then hit this refractory area 57 on the wall 36.

The particles entrained with the gas entering the separator 12 tend to flow along a straighter path than the gas. For example, when the gas flows into the vortex chamber 31 and changes its direction of movement in order to form a vortex, some of the particles mainly continue along their straight path eventually hitting the opposite wall 36. Due to the slowness of the change in the movement of the particles, the edge areas of the vortex chamber are susceptible to abrasion and preferably they have to be protected with a thicker layer of refractory or with a more resistant refractory, as seen at 57 in FIGS. 1 and 3.

FIG. 5 discloses an illustration of an embodiment, wherein a multivortex of two vortices is formed. Both vortices have their own inlet 30 at the corners of the chamber. Vortex guiding means 33 are also provided in proximity of the slots 30.

FIG. 6 discloses an assembly for arranging the cooling tubes according to the present invention. The partition wall 632 is formed of refractory lined tubes 610 connected with each other by fins 612 to form a substantially gas tight wall structure. At a location of the inlet opening 30, the tubes 610' are bent away so that they pass through and form a part of the guiding member 33 to form the jet-defining wall 40. In this embodiment the tubes 610" are near the first surface of the guiding member. Tubes 610' and 610" are lined with a refractory material, in the form of the refractory insert 33, having the guiding surface 47.

FIG. 7 discloses another assembly for arranging the cooling tubes according to the present invention. The partition wall 732 is also formed of refractory lined tubes 710 connected with each other by fins 712 to form a substantially gas tight wall structure. At a location of the inlet opening 30, the tubes 710' are bent away so that they pass through and form a part of the guiding member 33, having the surface 47 formed by a refractory coating on member 33. In this embodiment the tubes 710" are spaced substantially equally inside the guiding member 33. The tubes 610, 610', 610", 710, 710' and 710" illustrated in FIGS. 5 and 6 circulate cooling fluid (e.g. water or steam) therethrough to cool the gas flow direction changing surface 47.

Other configurations for the separator 12 are disclosed in U.S. Pat. 5,281,398, and may be readily modified to incorporate the invention.

In an exemplary method of separating particles from the stream gas having particles entrained therein and at a temperature of higher than 500° C. (typically about 900° C. once associated with a circulating fluidized bed reactor), a stream of gas with entrained particles is introduced into the high, narrow vertical inlet 30 into the gas volume 31 as a jet in a direction—shown by reference numeral 65 in FIG. 4—into a vertical axis swirling gas vortex—shown generally by arrows 66 in FIG. 4—formed in the gas volume 31. The jet and the vortex intersect at an intersection point shown schematically by reference numeral 67 in FIG. 4. Clean gas is removed from the top of the gas vortex 66 through the outlet conduit 54, while separated particles are removed from the bottom of the gas vortex 66, as indicated at reference numeral 44 in FIG. 1. The surface 47 smoothly changes the direction of any particles separating from gas in the vortex 66 in the vicinity of the first wall 32 from substantially along the first wall 32 to substantially in the direction of the jet 65, as indicated by arrow 68 in FIG. 4. The combination of the jet-defining wall 40 extending into the volume 31, and the smooth gas direction change provided by the surface 47, minimize interference with the jet 65 tangentially being introduced into the volume 31, and therefore maximize the swirling action of the gas vortex 66. The arrangement prevents settling of particles within the range of 270°–315° from the intersection point 67 (in the general curvature of the gas vortex 66).

It will thus be seen that according to the present invention an effective centrifugal separator and method of centrifugally separating particles have been provided which overcome the drawbacks associated with disturbances at the gas inlet in some configurations of substantially quadrate cross-section gas volume formed by planar walls as disclosed in U.S. Pat. 5,281,398. While the invention has been herein shown and described in what is presently conceived to be the most practical preferred embodiment thereof, it will be apparent to those of ordinary skill in the art that many modifications may be made thereof within the scope of the invention, which scope is to be interpreted broadly so as to encompass all equivalent structures and methods.

What is claimed is:

1. A centrifugal separator assembly comprising:

a plurality of substantially planar walls, including a first wall, defining a vortex chamber having an interior gas volume, and for establishing at least one gas vortex in said gas volume, said gas volume having a cross-section that is distinctly non-circular;

at least one gas outlet for cleaned gas extending from said vortex chamber and in communication with said gas volume;

at least one gas inlet formed in said first wall for introducing gas with entrained particles into said gas volume;

at least one separated particles outlet from the gas volume;

said gas inlet comprising at least one elongated jet-defining wall having a free end portion extending into said gas volume a first distance from said first wall, to define a gas jet extending substantially tangentially to a gas vortex in said gas volume; and guiding means for guiding the gas vortex between said first wall and said jet-defining wall so that the flow direction of particles separating from gas in the gas vortex is smoothly changed from generally along said first wall to substantially in line with said gas jet at said gas inlet.

2. A centrifugal separator as recited in claim 1 wherein the cross-section of said gas volume is substantially quadrate; and wherein said guiding means comprises an insert extending between said jet-defining wall free end portion and said first wall, and defining a gas flow direction changing surface.

3. A centrifugal separator as recited in claim 2 wherein said plurality of substantially planar walls comprises a second wall, substantially perpendicular to and intersecting said first wall; and wherein said at least one jet-defining wall comprises a single jet defining wall, substantially parallel to said second wall and spaced from said second wall a distance W, defining the width of said gas inlet, and wherein said gas inlet has a height H which is greater than 2 W.

4. A centrifugal separator as recited in claim 3 wherein said second wall has a length D interior said gas volume, and wherein said first distance is at least 50 mm. but less than 25% of D.

5. A centrifugal separator as recited in claim 2 wherein said plurality of substantially planar walls comprises a second wall, substantially perpendicular to and intersecting said first wall; and wherein said at least one jet-defining wall comprises a single jet defining wall, substantially parallel to said second wall and spaced from said second wall; and wherein said second wall has a length D interior said gas volume, and wherein said first distance is at least 50 mm. but less than 25% of D.

6. A centrifugal separator as recited in claim 2 wherein said gas direction changing surface is substantially planar.

7. A centrifugal separator as recited in claim 2 wherein said gas direction changing surface is curved.

8. A centrifugal separator as recited in claim 2 wherein said insert includes a plurality of cooling fluid circulating tubes which cool said gas direction changing surface.

9. A centrifugal separator as recited in claim 2 wherein said jet-defining wall, and portions of said first wall adjacent said insert, have a plurality of cooling fluid circulating tubes which cool said insert.

10. A centrifugal separator as recited in claim 2 wherein said plurality of substantially planar walls comprises at least second and third walls connected to said first wall; and wherein said at least one jet defining wall comprises two jet defining walls spaced from each other a distance W which defines the width of said inlet opening, the gas inlet having a height H which is greater than 2 W; and wherein said jet defining walls each have a free end portion which extends into said gas volume said first distance, and have an insert with gas direction changing surface, and are disposed in a central section of said first wall, remote from said second and third walls.

11. A centrifugal separator as recited in claim 10 wherein each of said jet defining walls makes an angle α with respect to said gas flow direction changing surface, said angle α being between 20–80 degrees.

12. A centrifugal separator as recited in claim 11 wherein said angle α is from about 40°–60°.

13. A centrifugal separator as recited in claim 11 wherein each of said inserts is a substantially solid insert of refractory material.

14. A centrifugal separator as recited in claim 11 wherein said first distance is between 0.2–5 times W.

15. A centrifugal separator as recited in claim 10 wherein said first distance is between 0.2–5 times W.

16. A centrifugal separator as recited in claim 2 wherein said insert is a substantially solid insert of refractory material, and wherein said substantially quadrate gas volume is rectangular.

17. A centrifugal separator as recited in claim 1 wherein said plurality of substantially planar walls each have an interior surface thereof, defining said gas volume, covered with a refractory material.

18. A centrifugal separator as recited in claim 17 wherein said plurality of substantially planar walls comprises a second wall, opposite said gas inlet in said first wall; and wherein said second wall opposite said gas inlet includes a refractory surface having enhanced erosion resistance properties compared to said refractory material covering the rest of the interior surfaces of said substantially planar walls.

19. A centrifugal separator as recited in claim 1 wherein said plurality of substantially planar walls comprises at least second and third walls connected to said first wall, extending substantially perpendicular thereto; and wherein said at least one jet defining wall comprises first and second jet defining walls defining two different gas inlets, said first jet defining wall adjacent but spaced from and substantially parallel to said second wall, and said second jet defining wall adjacent but spaced from and substantially parallel to said third wall, each of said jet defining walls and said first wall having a said guiding means.

20. A centrifugal separator assembly comprising:

a plurality of substantially planar walls, including a first wall, defining a vortex chamber having an interior gas volume, and for establishing at least one gas vortex in said gas volume, said gas volume having a cross-section that is distinctly non-circular and substantially quadrate;

at least one gas outlet for cleaned gas extending from said vortex chamber and in communication with said gas volume;

at least one gas inlet formed in said first wall for introducing gas with entrained particles into said gas volume;

at least one separated particles outlet from said gas volume;

said gas inlet comprising at least one elongated jet-defining wall having a free end portion extending into said gas volume a first distance from said first wall, to define a gas jet extending substantially tangentially to a gas vortex in said gas volume; and an insert extending between said jet-defining wall free end portion and said first wall, and defining a smooth flow direction changing surface.

21. A centrifugal separator as recited in claim 20 wherein said insert includes a plurality of cooling fluid circulating tubes which cool said gas direction changing surface.

22. A centrifugal separator as recited in claim 20 wherein said jet-defining wall, and portions of said first wall adjacent said insert, have a plurality of cooling fluid circulating tubes which cool said insert.

23. A centrifugal separator as recited in claim 20 wherein said insert is a substantially solid insert of refractory material.

24. A centrifugal separator as recited in claim 20 in combination with a circulating fluidized bed reactor having a reaction chamber, including a fluidized bed at a bottom portion of said reaction chamber and a gas discharge portion at a top portion of said reaction chamber and connected to said gas inlet of said centrifugal separator, said gas inlet extending substantially vertically, and said gas outlets leading cleaned gas from said separator gas volume upwardly out of said gas volume; and a return duct for particles leading from the bottom of said separator to said bottom portion of said reaction chamber.

25. A method of separating particles from a stream of gas having particles entrained therein and at a temperature of higher than 500° C., utilizing a centrifugal separator comprising a plurality of substantially planar walls, including a first wall, defining a vortex chamber having an interior gas volume, and for establishing at least one gas vortex in said gas volume, the gas volume having a cross-section that is distinctly non-circular, at least one gas outlet for cleaned gas extending from the vortex chamber and in communication with the gas volume, and at least one gas inlet formed in the first wall for introducing gas with entrained particles into the gas volume; said method comprising the steps of:

(a) introducing a stream of gas with entrained particles and at a temperature of higher than 500° C. into the distinctly non-circular gas volume as a jet in a direction tangential to a vertical axis swirling gas vortex formed in the gas volume, the jet and vortex intersecting at an intersection point;

(b) removing cleaned gas from the top of the gas vortex;

(c) removing separated particles from the bottom of the gas vortex; and (d) smoothly changing the direction of any particles separated from the vortex in the vicinity of the first wall from substantially along the first wall to substantially in the direction of the jet.

26. A method as recited in claim 25 wherein step (d) is practiced to prevent settling of particles within the range of 270°–315° from the intersection point.

27. A method as recited in claim 25 wherein step (a) is practiced by introducing gas with entrained particles in a flow configuration having a height and a width, said height at least twice as great as said width.

28. A method as recited in claim 25 wherein the gas inlet has a width W, and wherein step (a) is practiced so that the jet is introduced into the gas volume a distance from the first wall that is between 0.2–5 times W.

29. A method as recited in claim 25 wherein the gas volume is substantially quadrate in cross section, and has a width dimension extending from the gas inlet; and wherein step (a) is practiced so that the jet is introduced into the gas volume a distance from the first wall that is greater than 50 mm but less than 25% of the width dimension.

* * * * *